United States Patent
Uhl et al.

(10) Patent No.: US 9,395,884 B2
(45) Date of Patent: Jul. 19, 2016

(54) METHOD AND SYSTEM FOR NAVIGATING BETWEEN PAGES

(75) Inventors: Thomas Uhl, Hanhofen (DE); Michael Krenkler, Wiesloch (DE)

(73) Assignee: SAP SE, Walldorf (DE)

( * ) Notice: Subject to any disclaimer, the term of this patent is extended or adjusted under 35 U.S.C. 154(b) by 1541 days.

(21) Appl. No.: 12/236,513

(22) Filed: Sep. 24, 2008

(65) Prior Publication Data

US 2010/0077343 A1 Mar. 25, 2010

(51) Int. Cl.
*G06F 3/0483* (2013.01)
*G06F 3/0485* (2013.01)

(52) U.S. Cl.
CPC .......... *G06F 3/0483* (2013.01); *G06F 3/04855* (2013.01)

(58) Field of Classification Search
CPC ....................................................... G06F 3/048
USPC .......................................... 715/787, 854, 786
See application file for complete search history.

(56) References Cited

U.S. PATENT DOCUMENTS

| | | | | |
|---|---|---|---|---|
| 5,838,320 A * | 11/1998 | Matthews, III et al. | ....... | 715/786 |
| 6,204,846 B1 * | 3/2001 | Little et al. | ..................... | 715/784 |
| 6,348,936 B1 * | 2/2002 | Berteig | ......................... | 715/856 |
| 6,590,594 B2 * | 7/2003 | Bates et al. | ................... | 715/784 |
| 6,590,954 B1 * | 7/2003 | Koch | ............................... | 378/36 |
| 6,906,734 B2 * | 6/2005 | Subramanian et al. | ....... | 715/736 |
| 7,103,851 B1 * | 9/2006 | Jaeger | ........................... | 715/786 |
| 7,159,188 B2 * | 1/2007 | Stabb et al. | ................... | 715/787 |
| 7,328,411 B2 * | 2/2008 | Satanek | ........................ | 715/786 |
| 7,421,665 B2 * | 9/2008 | Molesky et al. | ............. | 715/854 |
| 7,574,669 B1 * | 8/2009 | Braun et al. | .................. | 715/777 |
| 7,676,759 B2 * | 3/2010 | Carter | .......................... | 715/783 |
| 2006/0174214 A1 * | 8/2006 | McKee et al. | ................. | 715/802 |
| 2007/0143705 A1 * | 6/2007 | Peters | .......................... | 715/786 |
| 2009/0006543 A1 * | 1/2009 | Smit | ............................. | 709/203 |

OTHER PUBLICATIONS

InDesign CS3 for Macintosh and Windows: Visual Quickstart Guide by Sandee Cohen published Oct. 8, 2007.*
Word 2007 for Starters: The Missing Manual by Chris Grover published Jan. 25, 2007.*

* cited by examiner

*Primary Examiner* — Doon Chow
*Assistant Examiner* — David Choi

(57) ABSTRACT

Described are methods and systems for navigating between pages of a document. A pagination scrollbar is provided on a portion of the computer user interface, to navigate from a first portion of the document to a second portion of the document. The pagination scrollbar includes a navigation selection area that displays a page selection menu based on a user action performed by the user. The page selection menu includes one or more pagination links, each pagination link representing a unique page in the document. The pagination links are operable to navigate from the current page to a page represented by one of the pagination links selected from the page selection menu, based on a pagination link selection.

20 Claims, 5 Drawing Sheets

METHOD AND SYSTEM FOR NAVIGATING BETWEEN PAGES

FIELD OF THE INVENTION

Embodiments of the invention generally relate to the field of user interface, and more specifically to a method and system for navigating between pages.

BACKGROUND OF THE INVENTION

Electronics documents are generally lengthy, and the complete document cannot be accommodated into available display area on a computer user interface. To navigate from one page to another continuously, a scrollbar can be used. Also, to navigate from a current page to another page in increments, generally a previous page or next page option is provided in the user interface. However, to navigate from a current page to one of the intermediate pages, the user has to select the option of previous page or next page a number of times, depending on where the page of interest lies in the document. For example, in a document containing 10 pages, if a user wants to navigate from page 3 to page 8, the user has to choose the option of next page five times. In such situations, the present scrolling options have been found to be less optimal. There is a need for a navigation system that allows the user to easily choose the page to navigate to, without having to go back and forth with the scrollbar or use the previous page/next page options.

SUMMARY OF THE INVENTION

Described are methods and systems related to a user interface for navigating between pages of a document. A pagination scrollbar is provided on a portion of the computer user interface, to navigate from a first portion of the document to a second portion of the document. The pagination scrollbar includes a navigation selection area that displays a page selection menu based on a user action. The page selection menu includes one or more pagination links, each pagination link correspondingly representing a unique page in the document. The pagination links are operable to navigate from the current page to a page represented by one of the pagination links selected from the page selection menu, based on a pagination link selection.

In an embodiment, the navigation selection area includes a first navigation selection area operable to display a first page selection menu, the first page selection menu further includes one or more pagination links, each pagination link representing a page preceding the current page, and a second navigation selection area operable to display a second page selection menu, the second page selection menu further includes one or more pagination links, each pagination link representing a page succeeding the current page.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

FIG. 1A is an example screen display of a user interface, including a scrollbar provided for navigating between pages of a document according to an embodiment of the invention.

FIG. 1B is an example screen display of the user interface of FIG. 1A to display a first page selection menu according to an embodiment of the invention.

FIG. 1C is an example screen display of the user interface of FIG. 1A to display a second page selection menu according to an embodiment of the invention.

DETAILED DESCRIPTION

Described are methods and systems for navigating between pages of a document. A computer user interface embodied on a computer readable media and executable on a computer is utilized for navigating between one or more pages of the document. A pagination scrollbar is provided on a portion of the computer user interface, to navigate from a first portion of the document to a second portion of the document. The pagination scrollbar includes a navigation selection area that displays a page selection menu based on a user action performed by the user. The page selection menu includes one or more pagination links, each pagination link representing a unique page in the document. The pagination links are operable to navigate from the current page to a page represented by one of the pagination links selected from the page selection menu, based on a pagination link selection.

Figure 1A:
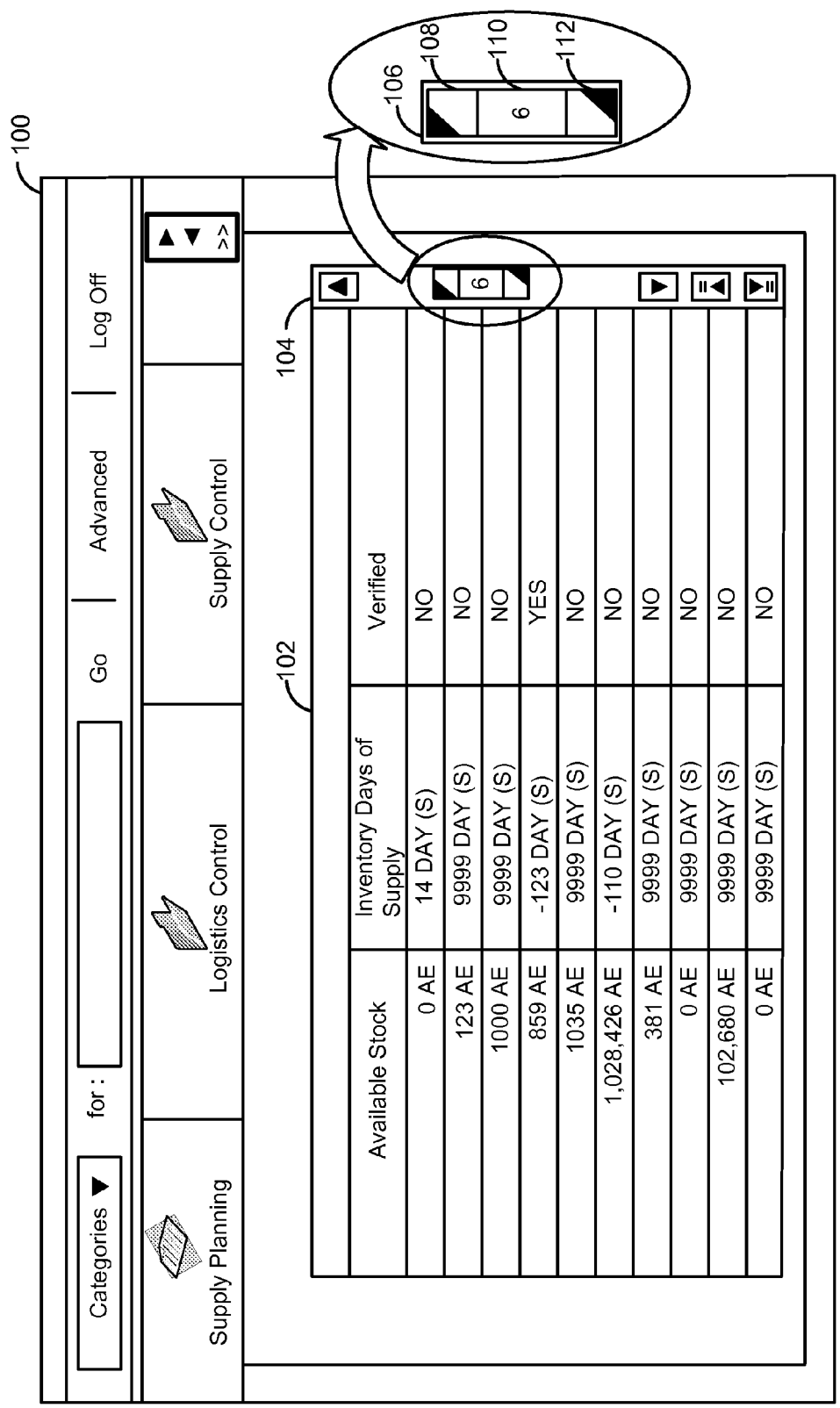
FIG. 1A-FIG. 1C illustrate a computer user interface provided for navigating between pages of a document according to an embodiment of the invention.
Figure 1B:
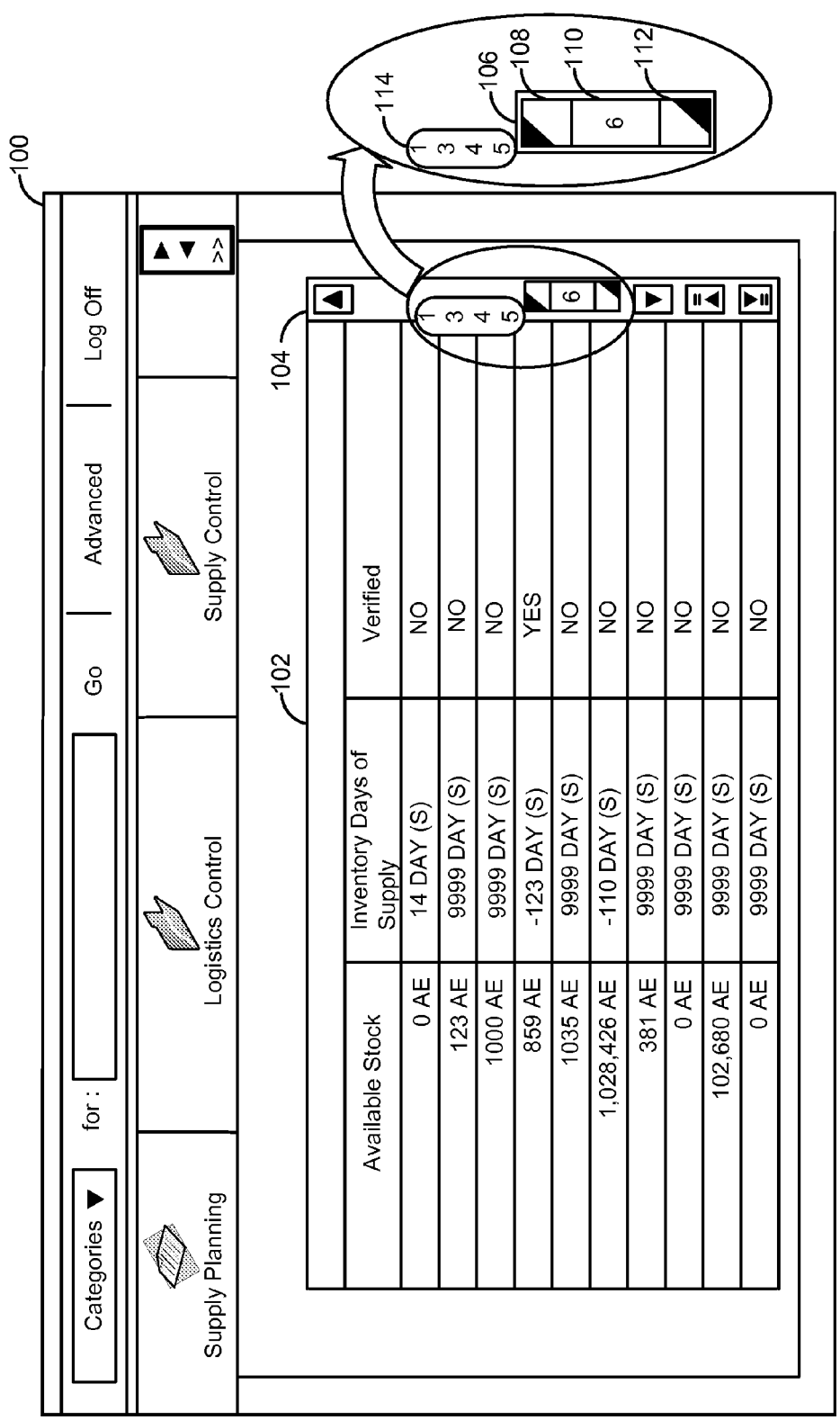
Figure 1C:
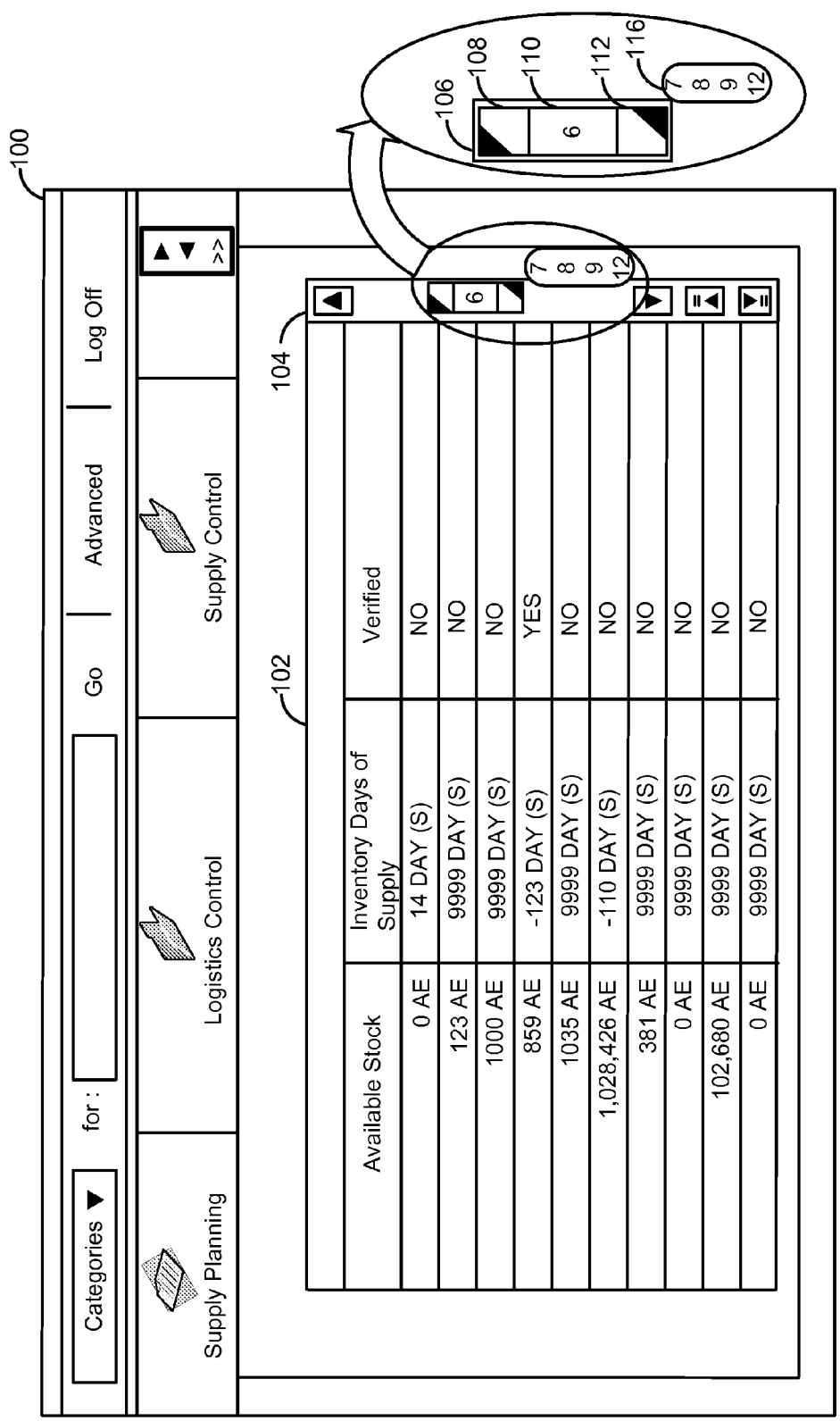

In an embodiment, the navigation selection area includes a first navigation selection area operable to display a first page selection menu, the first page selection menu further includes one or more pagination links, each pagination link representing a page preceding the current page, and a second navigation selection area operable to display a second page selection menu, the second page selection menu further includes one or more pagination links, each pagination link representing a page succeeding the current pages. FIG. 1A-FIG. 1C illustrate a computer user interface provided for navigating between pages of a document according to an embodiment of the invention. FIG. 1A is an example screen display of a user interface, including a scrollbar provided for navigating between pages of a document according to an embodiment of the invention. FIG. 1B is an example screen display of the user interface of FIG. 1A to display a first page selection menu according to an embodiment of the invention. FIG. 1C is an example screen display of the user interface of FIG. 1A to display a second page selection menu according to an embodiment of the invention.

Computer user interface 100 illustrates exemplary methods and systems of the present invention. Computer user interface 100 is typically a means for providing an interface for a user to interact with a machine. Behavior of the computer user interface may typically be governed by computer-executable instructions that are executed as a user interacts with the user interface. Computer user interface 100 generally refers to any information that a program presents to the user, and depicts various types of relationships between user interface (UI) elements that the user employs to control the program. UI elements include animation control, pop-up menu, progress bar control, check box, push button, radio button, scrollbar, drop down menu, tooltip, and the like.

Computer user interface 100 displays a portion of current page 102 of a document. The document includes a plurality of pages or items that represent a collection of information. Typically, the pages or items of the document may include text, picture, sound, video, tables, charts and the like. Current page 102 is displayed on a viewing area of computer user interface 100. Current page 102 represents one of the plurality of pages or items currently viewed on computer user interface 100.

Computer user interface 100 includes scrolling section 104. Scrolling section 104 is typically designed as a long rectangular area (e.g. scrolling area) on one or more sides of the viewing area on computer user interface 100. Scrolling section 104 typically includes a scrollbar (e.g. pagination scrollbar) that can be moved along the scrolling area, to move the document. Scrolling section 104 allows the user to scroll the scrollbar in vertical directions (e.g. upwards or downwards), to view the portions of the document that are currently not displayed on computer user interface 100. In an embodiment, scrolling section 104 allows the user to scroll the scrollbar in horizontal directions, to view the portions of the document that are currently not displayed on computer user interface 100. Scrolling section 104 may include a previous-arrow section to move from current page 102 to a previous page of the document, and a next-arrow section to move from current page 102 to a next page of the document.

Scrolling section 104 includes pagination scrollbar 106. Pagination scrollbar 106 is used to change the viewing area of the document, thereby changing current page 102 that is being viewed. Pagination scrollbar 106 is typically a UI element with which, continuous documents can be scrolled and viewed even if the document cannot be accommodated into the available display area on a computer user interface 100. Pagination scrollbar 106 may also be dragged to a position intermediate between two pages. Pagination scrollbar 106 may be incorporated into any kind of computer display. Pagination scrollbar 106 may also be operable to slide from the first portion of the document to the second portion of the document. Page number display area 110 displays the page number of current page 102 that is being viewed on computer user interface 100. For example, in FIG. 1A, page number display area 110 displays the page number '6' that is currently being viewed on computer user interface 110. In other embodiments, page number display area 110 may also provide other information about the portion of the document that is currently being viewed in addition to the page number.

In one embodiment, pagination scrollbar 106 includes a first navigation selection area 108, second navigation selection area 112 and the page number display area 110. First navigation selection area 108 and second navigation selection area 112 are operable based on a user action. The navigation selection areas are operable to display any information, based on the user action. For instance, first navigation selection area 108 may display a first instance of the page selection menu and second navigation selection area 112 may display a second instance of the page selection menu, based on a user action. The first instance of the page selection menu and the second instance of the page selection menu may include a list of menu items. In another embodiment, pagination scrollbar 106 includes a first portion of the navigation selection area and a second portion of the navigation selection area.

In another embodiment, pagination scrollbar 106 includes a first half portion located along a direction of the pages preceding current page 102 and a second half portion located along a direction of the pages succeeding current page 102. A first portion of the navigation selection area occupies a part of the first half portion of pagination scrollbar 106 and a second portion of the navigation selection area occupies a part of the second half portion of pagination scrollbar 106. In yet another embodiment, pagination scrollbar 106 includes a first end portion located along a direction of the pages preceding current page 102 and a second end portion located along a direction of the pages succeeding current page 102. The first portion of the navigation selection area occupies a part of the first end portion of pagination scrollbar 106 and the second portion of the navigation selection area occupies a part of the second end portion of pagination scrollbar 106.

User actions may include a hover action that is performed on first navigation selection area 108 or second navigation selection area 112. For instance, first navigation selection area 108 displays first page selection menu 114 based on the user action performed on first navigation selection area 108. Second navigation selection area 112 displays second page selection menu 116 based on the user action performed on second navigation selection area 112. It will be appreciated that a variety of user actions may be performed to implement the teachings of the invention as described herein. The location of navigation selection areas may correspond to the direction of navigation associated therewith. For instance, first navigation selection area 108 might be operable for navigating to pages preceding current page 102 because it is located in the part of pagination scrollbar 106 pointing to the preceding page. Second navigation selection area 112 might be operable for navigating to pages succeeding current page 102 because it is located in the part of pagination scrollbar 106 pointing to the succeeding pages.

A page selection menu is a drop down menu, which is a UI element that typically includes a group of UI elements in the form of a list, which is generally displayed when the title of the drop down menu is activated. In one embodiment, the page selection menus (e.g., 114 and 116), which is presented in response to a user action with respect to one of the navigation selections areas (e.g., 108 and 112), is a page menu. Other menu formats operable for receiving a user selection can be used instead of or in combination with the page menu. First page selection menu 114 includes one or more pagination links, each pagination link correspondingly representing a unique page of the document preceding current page 102. Second page selection menu 116 includes one or more pagination links, each pagination link represents a unique page succeeding current page 102 in the document. These links may include some information to indicate the page number they correspond with. For instance, in one embodiment, first page selection menu 114 includes a list of page numbers correspondingly associated with the pages preceding current page 102, whereas second page selection menu 116 includes a list of page numbers correspondingly associated with pages succeeding current page 102.

In an embodiment, pagination links are hyperlinks. A hyperlink is a UI element that typically indicates a reference in the document. The hyperlink can be considered as a navigation element that allows navigating from a present portion of a document to a portion of the document represented by the hyperlink. For example, a name of a website may be representing a hyperlink that displays the homepage of the website when activated. In an embodiment, the user may click on one of the pagination links displayed on first navigation selection menu 114 or second navigation selection menu 116. In another embodiment, a user may activate the pagination link with an input device to cause navigation to a corresponding portion of the document represented by the pagination link selected. Once a selection is made on the pagination link, the selection is recognized, and controls navigate to the page represented by the selected pagination link. In an embodiment, the controls are navigation controls that recognize the reference of the selected pagination link, and navigate to the page represented by the selected pagination link.

In an embodiment, actions to be performed on activating controls such as first navigation selection area 108, second navigation selection area 112, and the pagination links may be interpreted in combination with instructions to generate results corresponding to the particular combination of user action and the control it was performed on. For example, the actions to be performed may include displaying first page selection menu 114, second page selection menu 116, navigating to a page represented by selected pagination link, and the like. The instructions may receive signals from an input device, and perform the corresponding action. For example, a hover action performed by a mouse pointer on first navigation selection area 108 may be recognized by one or more instructions, and the instructions may generate a corresponding first page selection menu 114. Furthermore, the instructions may recognize the pagination link selected on first page selection menu 114, and perform a navigation action to the page represented by the selected pagination link.

In the exemplary illustrations of FIGS. 1A-1C, pagination scrollbar 106 is depicted for navigating vertically in a document. However, the invention is not so limited. For instance, pagination scrollbar 106 can be adapted for scrolling horizontally between parts of a document. In one embodiment, the navigation selection areas can be located on the sides of pagination scrollbar 106 corresponding in direction of their navigation as described above with respect to vertical scrolling.

Figure 2:
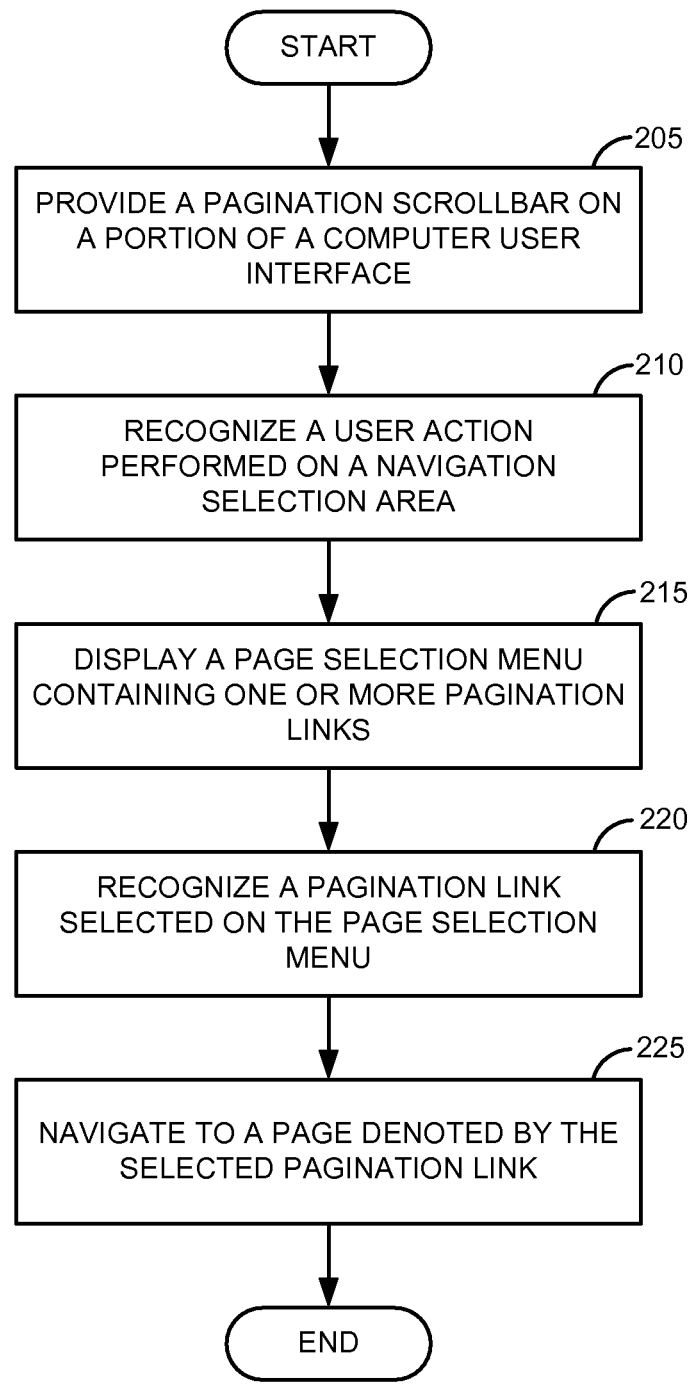
FIG. 2 is a flow diagram of a process for navigating between pages of a document according to an embodiment of the invention.

FIG. 2 is a flow diagram of a process for navigating between pages of a document according to an embodiment of the invention. In process block 205, a pagination scrollbar is provided on a portion of a computer user interface. The pagination scrollbar typically includes one or more navigation selection areas and a page number display area. In process block 210, a user action performed on a navigation selection area is recognized. The navigation selection area is typically operable based on a user action. In one embodiment, the user action is a hover action performed on the navigation selection area. The hover action is a UI event that is typically activated when a mouse pointer is moved or hovered over an area that recognizes the hover action (e.g., an asynchronous JavaScript and XML hover event pop-up/-under).

In process block 215, a page selection menu containing one or more pagination links is displayed. The page selection menu can be any UI element that typically includes a group of UI elements in the form of a list, which is generally displayed when the title of the page selection menu is activated. The page selection menu includes one or more pagination links, each pagination link representing a unique page preceding the current page in the document. In one embodiment, the pagination link is a hyperlink, which is a UI element that indicates a reference in the document. The hyperlink can be considered as a navigation element that allows navigating from a present portion of a document to a portion of the document represented by the hyperlink. In an embodiment, a first navigation selection area displays a first page selection menu based on the user action performed on the first navigation selection area. A second navigation selection area displays second page selection menu based on the user action performed on the second navigation selection area.

In process block 220, a pagination link selection performed on the page selection menu is recognized. In an embodiment, pagination links are hyperlinks. A hyperlink is a UI element that typically indicates a reference in the document. The pagination hyperlink can be considered as a navigation element that allows navigating from a present portion of a document to a portion of the document represented by the hyperlink. The selection of pagination link is typically performed by a user action. In an embodiment, the user may click on one of the pagination links displayed on the navigation selection menu. In process block 225, control is navigated to a page denoted by the selected pagination link is performed. In an embodiment, the controls are navigation controls that recognize the reference of the selected pagination link, and navigate to the page represented by the selected pagination link. On performing navigation action, the page represented by the selected pagination link is displayed as a current page.

Figure 3:
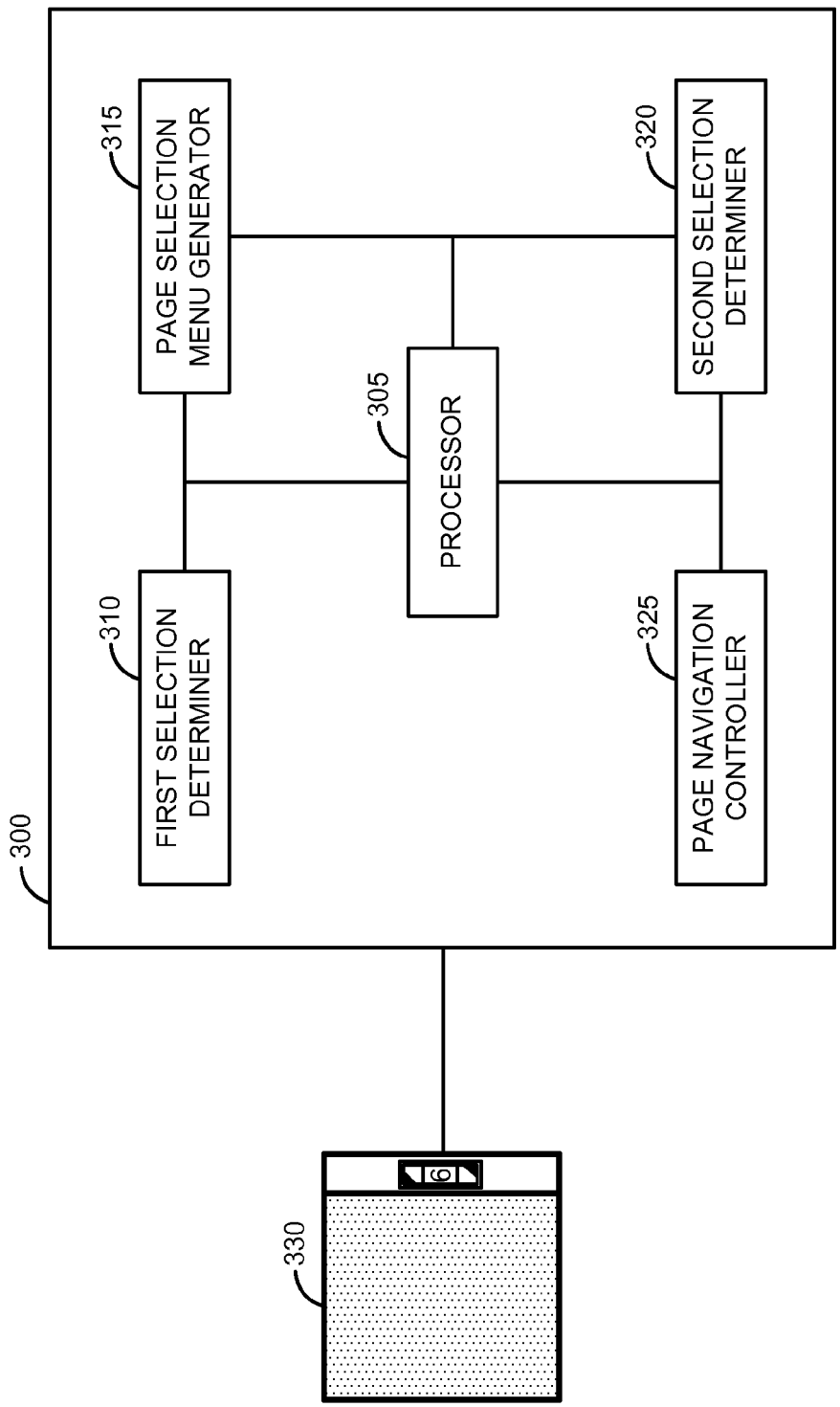
FIG. 3 is a block diagram of a system for navigating between pages of a document according to an embodiment of the invention.

FIG. 3 is a block diagram of a system for navigating between pages of a document according to an embodiment of the invention. System 300 is in communication with computer user interface 330 in an application running on a machine that displays a current page of a document. System 300 typically includes first selection determiner 305, processor 310, page selection menu generator 315, second selection determiner 320, and page navigation controller 325. According to an embodiment, first selection determiner 305 is in communication with processor 310, and page selection menu generator. Page selection menu generator 315 is in communication with processor 310 and second selection determiner. Furthermore, second selection determiner 320 is in communication with processor 310 and page navigation controller 325.

System 300 allows the user to navigate between pages of the document using a pagination scrollbar. Computer user interface 330 is a means for providing an interface for a user to interact with a machine. In an embodiment, the user may view a document containing one or more pages on computer user interface 330. In another embodiment, the user may perform user actions on computer user interface 330. Computer user interface 330 typically includes a pagination scrollbar.

First selection determiner 310 determines any user action performed on the navigation selection areas on the pagination scrollbar. In an embodiment, the user performs a user action on a navigation selection area on the pagination scrollbar. First selection determiner 310 determines the user action performed on the navigation selection area on the pagination scrollbar. Processor 305 recognizes the user action determined by first selection determiner 310.

Based on the navigation selection area on which the user action is performed, page selection menu generator 315 generates a page selection menu. In one embodiment, processor 305 stores one or more page selection menus, and based on the user action determined by first selection determiner 310, processor 305 establishes a communication with page selection menu generator 315 to generate the appropriate page selection menu. The page selection menu comprises one or more pagination links. The page selection menu is a UI element that typically includes a group of UI elements in the form of a list, which is generally displayed when the title of the page selection menu is activated. The page selection menu typically includes one or more pagination links, each pagination link representing a unique page preceding the current page in the document. The pagination link is typically a hyperlink, which is a UI element that indicates a reference in the document. The hyperlink can be considered as a navigation element that allows navigating from a present portion of a document to a portion of the document represented by the hyperlink.

Second selection determiner 320 determines any user action performed on the page selection menu. In an embodiment, the user performs a selection of a pagination link on the page selection menu. Second selection determiner 320 determines the selection performed on the page selection menu. Processor 305 recognizes the selection determined by second selection determiner 320. In an embodiment, processor 305 stores the references of all the pagination links that are provided on the page selection menu. Based on the selection determined by second selection determiner 320, processor 305 establishes a communication with page navigation controller 325 to navigate to a page represented by the pagination link selected by the user.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer user interface, embodied on one or more non-transitory computer-readable media and executable on a computer, to navigate between one or more pages of a document, wherein at least one page is displayed as a current page on the computer user interface, the computer user interface comprising:

a movable pagination scrollbar provided on a portion of the computer user interface to navigate from a first portion of the document to a second portion of the document including, navigating between the one or more pages of the document, moving along a scrolling area to move the document, and moving to positions intermediate between two pages of the document;

the movable pagination scrollbar comprising a navigation selection area at least partially within the movable pagination scrollbar to display a page selection menu based on a user action, wherein the page selection menu comprises one or more pagination links correspondingly representing the one or more pages of the document; and the pagination links to navigate from the current page to one of the one or more pages of the document corresponding to the selected pagination link, based on a pagination link selection.

2. The computer user interface of claim 1, wherein the navigation selection area further comprises:

a first portion of the navigation selection area displaying a first instance of the page selection menu comprising one or more pagination links correspondingly representing the pages preceding the current page; and a second portion of the navigation selection area displaying a second instance of the page selection menu comprising one or more pagination links correspondingly representing the pages succeeding the current page.

3. The computer user interface of claim 2, wherein the movable pagination scrollbar comprises a first half portion located along a direction of the pages preceding the current page and wherein the first portion of the navigation selection area occupies a part of the first half portion of the movable pagination scrollbar.

4. The computer user interface of claim 2, wherein the movable pagination scrollbar comprises a second half portion located along a direction of the pages succeeding the current page and wherein the second portion of the navigation selection area occupies a part of the second half portion of the movable pagination scrollbar.

5. The computer user interface of claim 2, wherein the movable pagination scrollbar comprises a first end portion located along a direction of the pages preceding the current page and wherein the first portion of the navigation selection area occupies a part of the first end portion of the movable pagination scrollbar.

6. The computer user interface of claim 2, wherein the movable pagination scrollbar comprises a second end portion located along a direction of the pages succeeding the current page and wherein the second portion of the navigation selection area occupies a part of the second end portion of the movable pagination scrollbar.

7. The computer user interface of claim 1, wherein the movable pagination scrollbar is operable to scroll horizontally from the first portion of the document to the second portion of the document.

8. The computer user interface of claim 1, wherein the movable pagination scrollbar is operable to scroll vertically from the first portion of the document to the second portion of the document.

9. The computer user interface of claim 1, wherein the movable pagination scrollbar is contained within a scrolling section of the computer user interface.

10. The computer user interface of claim 1, wherein the page selection menu comprises a drop down menu.

11. The computer user interface of claim 1, wherein the user action comprises a hover action.

12. The computer user interface of claim 1, wherein the pagination link comprises a hyperlink.

13. The computer user interface of claim 1, wherein the location of the navigation selection area corresponds to a direction of navigation associated with the navigation selection area.

14. A computer user interface, embodied on one or more non-transitory computer-readable media and executable on a computer, to navigate between one or more pages of a document, wherein at least one page is displayed as a current page on the computer user interface, the computer user interface comprising:
- a movable pagination scrollbar provided on a portion of the computer user interface, to navigate from a first portion of the document to a second portion of the document including, navigating between the one or more pages of the document, moving along a scrolling area to move the document, and moving to positions intermediate between two pages of the document;
- a first navigation selection area provided at least partially within the movable pagination scrollbar, to display a first page selection menu based on a first user action;
- the first page selection menu comprising one or more pagination links, each pagination link denoting a unique page preceding the current page, wherein each pagination link is operable to navigate from the current page to a preceding page denoted by the pagination link selected from the page selection menu, based on a second user action;
- a second navigation selection area provided at least partially within the movable pagination scrollbar, to display a second page selection menu based on the first user action; and
- the second page selection menu comprising one or more pagination links, each pagination link denoting a unique page succeeding the current page, wherein each pagination link is operable to navigate from the current page to a succeeding page denoted by the pagination link selected from the page selection menu, based on the second user action.

15. The computer user interface of claim 14, wherein the at least one of the first user action and the second user action comprise an action selected from a group consisting of a hover action, a mouse click, a key selection performed on a keyboard, a time based events and touch screen inputs.

16. A computer to navigate between one or more pages of a document in a computer user interface, the computer comprising:
- a first selection determiner, in communication with the computer user interface, to determine a first user selection performed on a navigation selection area at least partially within a movable pagination scrollbar;
- a menu generator, in communication with the first selection determiner and the computer user interface, to display a page selection menu based on the first user selection;
- a second selection determiner, in communication with the menu generator and the computer user interface, to determine a second user selection performed on the page selection menu; and
- a page navigator, in communication with the second selection determiner and the computer interface, to navigate from a current page to a page denoted by the second user selection.

17. The computer of claim 16, wherein the movable pagination scrollbar to navigate from a first portion of the document to a second portion of the document including navigating between pages of the document, moving along a scrolling area to move the document and moving to a position intermediate between two pages.

18. The computer of claim 16, wherein the page selection menu comprises one or more pagination links correspondingly representing the one or more pages of the document.

19. The computer of claim 16, wherein the second user selection performed on the page selection menu further comprises selecting one of the one or more pagination links.

20. A computer implemented method to navigate between one or more pages of a document, wherein at least one of the one or more pages is displayed as a current page on the computer user interface, the method comprising:
- providing a navigation selection area in a portion of a movable pagination scrollbar, the movable pagination scrollbar provided on a portion of the computer user interface, to navigate from a first portion of the document to a second portion of the document including navigating between the one or more pages of the document, moving along a scrolling area to move the document, and moving to a position intermediate between two pages of the document;
- based on a user action related to the navigation selection area, causing a page selection menu to be displayed, the page selection menu comprising a one or more pagination links correspondingly representing the one or more pages of the document; and
- based on a pagination link selection performed on one of the one or more pagination links, navigating from the current page on the computer user interface to a page denoted by a page number of the one of the plurality of pages selected by the user.

* * * * *